United States Patent [19]

Byron

[11] Patent Number: 5,434,702
[45] Date of Patent: Jul. 18, 1995

[54] OPTICAL REPEATERS

[75] Inventor: Kevin C. Byron, Bishop's Stortford, United Kingdom

[73] Assignee: Northern Telecom Limited, Montreal, Canada

[21] Appl. No.: 363,572

[22] Filed: Dec. 22, 1994

Related U.S. Application Data

[63] Continuation of Ser. No. 20,689, Feb. 22, 1993, abandoned.

[30] Foreign Application Priority Data

Mar. 4, 1992 [GB] United Kingdom ............... 9204650

[51] Int. Cl.$^6$ ............ H01S 3/07; H01S 3/1055; H01S 3/139
[52] U.S. Cl. ........................ 359/341; 385/10
[58] Field of Search .......... 359/130, 176, 341, 572; 370/23, 32; 385/10, 37

[56] References Cited

U.S. PATENT DOCUMENTS

| | | | |
|---|---|---|---|
| 4,749,248 | 6/1988 | Abersan et al. | 359/176 |
| 4,778,238 | 10/1988 | Hicks | 359/176 |
| 4,793,680 | 12/1988 | Bryan | 359/572 |
| 5,048,909 | 9/1991 | Henry et al. | 385/27 |
| 5,187,760 | 2/1993 | Huder | 385/37 |
| 5,191,586 | 3/1993 | Huber | 359/341 |
| 5,260,823 | 11/1993 | Payne et al. | 359/341 |
| 5,268,910 | 12/1993 | Huber | 359/341 |

FOREIGN PATENT DOCUMENTS

| | | |
|---|---|---|
| 2161612 | 7/1984 | United Kingdom . |
| 2254183 | 9/1992 | United Kingdom . |
| WO91/03753 | 3/1991 | WIPO . |

OTHER PUBLICATIONS

Davey et al, Electronics Letters, vol. 27, No. 22, Oct. 24, 1991, pp. 2087–2088.

Optics, Hecht–Zajac, 1974, pp. 354–364, QC 355.2, by Addison-Wesley Publ. Co. Inc.

Millar, C. A.; 16 European Conf. Opt. Comm., Sep. 20, 1990, Netherlands; vol. 2, pp. 717–724.

Primary Examiner—Nelson Moskowitz
Attorney, Agent, or Firm—Lee, Mann, Smith, McWilliams, Sweeney & Ohlson

[57] ABSTRACT

An optical repeater is comprised by an amplifying optical fibre (5) and directional coupler means (3). An input pulse (1) is reflected, by a respective grating (7) written in the optical fibre, in dependence on the spectral content of the pulse (1). The output pulse (8) is thus reshaped (amplified) and narrowed spectrally. The gratings have different spacings, at least in use of the repeater, so that output pulses with predetermined characteristics can be achieved.

10 Claims, 1 Drawing Sheet

OPTICAL REPEATERS

This application is a continuation, of application Ser. No. 020,689, filed Feb. 22, 1993, now abandoned.

BACKGROUND OF THE INVENTION

This invention relates to optical repeaters including optical regenerators, that is to say optical means for both reshaping (amplifying) and narrowing spectrally optical pulses.

Optical amplifiers such as erbium doped fibre amplifiers are finding increasing application. However, they simply provide amplification whereas, for example, for long distance telecommunications, such as submarine applications, spectral narrowing is also required.

SUMMARY OF THE INVENTION

According to the present invention there is provided an optical repeater comprising an amplifying optical waveguide and directional coupler means serving to couple an input optical pulse to said waveguide and to couple a corresponding output optical pulse therefrom, the optical waveguide having a number of gratings along its length, a respective one of which in dependence on the spectral content of the input pulse serves to reflect the input optical pulse back to the coupler means in use of the repeater, the amplifying optical waveguide thereby serving to amplify the input optical pulse differentially, and the repeater thereby providing output pulses with predetermined characteristics.

BRIEF DESCRIPTION OF THE DRAWINGS

Embodiments of the invention will now be described with reference to the accompanying drawings, in which.

DESCRIPTION OF THE PREFERRED EMBODIMENTS

Figure 1:
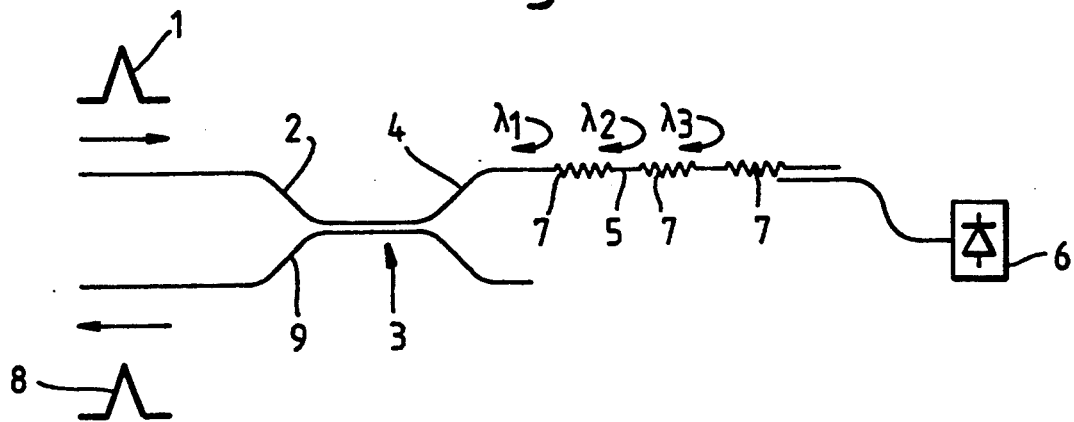
FIG. 1 illustrates, schematically, an embodiment of optical repeater according to the present invention.

Referring firstly to FIG. 1, it is assumed that an incoming pulse 1 to be amplified is chirped, that is it has a spectral chirp (varies in wavelength) due to the dispersion of the fibre along which it is transmitted. As illustrated, this incoming pulse 1 is applied to one arm 2 of a 3 dB optical fibre coupler 3. To another arm 4 of the coupler 3 is connected a length of erbium doped optical fibre 5. The erbium doped fibre 5 is pumped by a pump 6 outputting at a suitable wavelength whereby to achieve amplification of an input pulse such as 1. Gratings 7, of different spacings as illustrated, are written in the erbium doped fibre 5. Hence the gratings serve to reflect different wavelength components, as illustrated, wavelength $\lambda_1$, is reflected by the first grating encountered by an input pulse; wavelength $\lambda_2$ is reflected by the second grating encountered by an input pulse and wavelength $\lambda_3$ is reflected by the third grating encountered by the input pulse.

Figure 2:
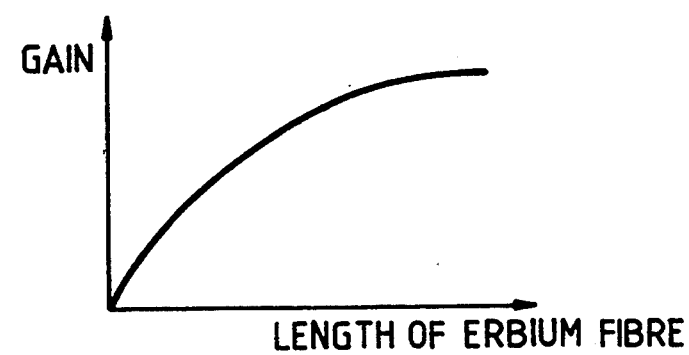
FIG. 2 illustrates the variation of gain with length for erbium doped optical fibre.
Figure 3:
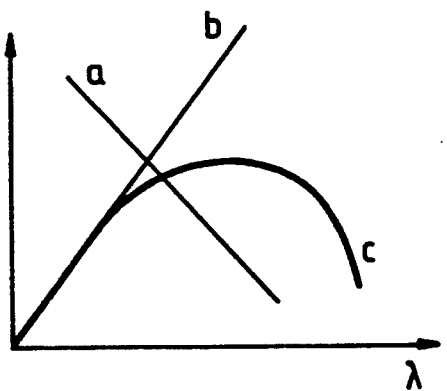
FIG. 3 illustrates the variation of gain with wavelength for erbium doped optical fibre in which gratings have been written.

As mentioned, the erbium doped fibre is pumped by pump 6, this being reverse pumping as the pump signal is directed in the opposite direction to the propagation direction of the input pulse. Gain is achieved in the fibre as a function of length therealong, as illustrated in FIG. 2. This highest gain being achieved in the erbium doped fibre closest to the pump. Hence a different amount of gain is applied to each reflected spectral component (different wavelength $\lambda_1$, $\lambda_2$, $\lambda_3$) i.e. there is differential gain and this can be tailored in order to reshape the pulse spectrally as desired, by adjusting the selected grating spacings. Any pulse shaping characteristic may be selected. FIG. 3 shows variation of gain with wavelength for the wavelength increasing (a) and decreasing (b) (these being determined by the gratings) and also wavelength peaking (c). The reshaped output pulse 8 is output from arm 9 of coupler 3. The optical repeater of FIG. 1 thus narrows (spectrally) and reshapes (amplifies) an input pulse. This is in comparison with our previous proposal GB 2161612B (R E Epworth 27) which achieves pulse narrowing alone in a chromatic dispersion equaliser comprising a chirped Bragg reflector permanently written in an optical fibre coupled to a transmission fibre by directional coupler means which may comprise, for example a 3dB optical fibre coupler as mentioned above, or a optical circulator which does not involve the 3dB loss of the optical fibre coupler. Since the repeater of the present invention involves gain, the 3dB loss inherent with the fibre coupler is of little consequence, i.e. only 3dB gain is required to overcome the loss at the coupler and this can easily be provided by the erbium doped fibre. As illustrated in FIG. 3, curve (a) indicates that the gain decreases with increasing wavelength and the arrangement can be tailored as required. The variations in the gratings do not necessarily have to involve a linear increase. The gratings spacings are chosen to achieve the required shaping and could for example involve the first and third gratings of FIG. 1 having respective spacings which are both different but are also both greater or smaller than the second grating.

The chirped Bragg reflector of our previous proposal comprised a conventional single mode communications fibre in which the grating can be permanently written by a technique first proposed by K O Hill et al in 1978, "Photosensitivity in optical fibre wavelengths: application to reflection fibre fabrication: Appl. Phys. Lett. 32,647(1978), although this is not the only method which can be employed. The Hill method involves axially written gratings achieved due to photorefractive effects. It is the photosensitivity of the conventional fibre which provides the photorefraction, and the photosensitivity effect in conventional fibre which has been most studied is believed to be due to germania defects in the germania doped silica. Another method which can be employed for producing photorefractive (phase) gratings is that of transversly written holographic gratings. Surface relief gratings can also be produced such as by the method described in GB 2189901B (K C Byron 24) involving plasmon/polariton excitation, or by laser micro-machining. An advantage of the latter method is that long gratings may be written and chirped and phase-jumped features readily incorporated into the gratings. The basic Hill method for grating writing may be used to write a series of differently spaced gratings in a single length of fibre if, for example, the fibre has a gradient of conditions applied to it whilst the grating is being written, or if such a gradient of conditions is subsequently applied by stretching the fibre, as discussed in GB 2161612B. Alternatively differently spaced gratings can be written in different lengths of fibres which are subsequently spliced together.

Whereas FIG. 1 and the above description relate to a number of gratings each having different spacings provided in an erbium doped fibre, an alternative is to provide a number of identical gratings (identical spacing) along a fibre and provide each of them with a respective overlay of a non-linear material. When the non-linear overlay of any such grating is optically pumped, the refractive index changes and hence the associated grating spacing changes. Hence the result produced by such an arrangement can be tailored to produce any required pulse reshaping as well as amplification.

The Hill or other photorefractive based methods of grating writing whilst previously only applied to conventional communications optical fibre (germania doped silica) are not adversely affected by the presence of erbium since the latter does not involve a photorefractive effect. When gratings are so written, the erbium is not involved; it is effectively not present. The erbium is required in the present instance solely for providing gain i.e. an amplifying medium. Other rare earths, such as europium, could be added to the erbium fibre since europium does exhibit a photorefractive effect and this is required for grating writing by the Hill-based method. Basically, however, erbium doped $GeO_2/SiO_2$ fibre will provide good gratings in view of the germania. The additional presence of europium, for example, may provide enhanced grating writing as well as enhanced gain.

Erbium doped silica-based optical fibres have been specifically referred to above, however it is considered that similar effects will be obtainable with polymer optical fibres, particularly in view of their high non-linearity and their being very photosensitive, which latter is particularly of interest from the grating writing aspect.

I claim:

1. An optical repeater comprising an input port, an output port, a length of amplifying optical waveguide and a directional coupler providing optical coupling between the length of waveguide and the input and output ports, wherein the optical waveguide is provided with a set of spectrally selectively reflective Bragg gratings distributed along its length, each one of the set of gratings having, in use, a pitch providing that grating with a spectral reflectivity different from that of each of the other gratings of the set and serving to reflect light launched into the waveguide from the input port via the coupler back through the coupler to the output port, whereby different spectral components of the light propagate different distances in said waveguide, and hence are differentially amplified by the repeater.

2. An optical repeater as claimed in claim 1, wherein the amplifying optical wave guide is a length of amplifying optical fibre one end of which is coupled to said directional coupler means.

3. An optical repeater as claimed in claim 2, wherein an optical pump source is coupled to the other end of the amplifying optical fibre.

4. An optical repeater as claimed in claim 1 wherein the fibre is an erbium doped amplifying optical fibre.

5. An optical repeater as claimed in claim 1, wherein the fibre is a polymer optical fibre.

6. An optical regenerator as claimed in claim 2 wherein the directional coupler means is an optical fibre coupler.

7. An optical repeater as claimed in claim 1 and wherein the gratings were permanently written in the optical fibre.

8. An optical repeater as claimed in claim 1, wherein the gratings have the same spacings when the repeater is not in use and wherein means are provided whereby in use of the repeater the spacing of one or more of the gratings is changed.

9. An optical repeater as claimed in claim 8 wherein the gratings are permanently written in the optical fibre and are each provided with a respective non-linear overlay, and including optical pump means for the overlays whereby in use the pump means for the overlay of a predetermined grating is actuated and the spacing of the predetermined grating changed.

10. An optical repeater as claimed in claim 1 wherein the fibre is an erbium doped amplifying $GeO_2/SiO_2$ optical fibre.

* * * * *